United States Patent [19]

Hill

[11] Patent Number: 4,837,574

[45] Date of Patent: Jun. 6, 1989

[54] NEAR-FIELD MONOSTATIC INTRUSION DETECTION SYSTEM

[75] Inventor: Robert V. Hill, Seattle, Wash.

[73] Assignee: The Boeing Company, Seattle, Wash.

[21] Appl. No.: 39,232

[22] Filed: Apr. 17, 1987

[51] Int. Cl.⁴ .................. G01S 13/04; G01S 15/04
[52] U.S. Cl. ...................................... 342/27; 367/93; 342/94
[58] Field of Search ............... 342/27, 29, 146, 147, 342/148, 156, 28, 74, 81, 360, 44; 367/93, 94; 340/552, 554

[56] References Cited

U.S. PATENT DOCUMENTS

| | | | |
|---|---|---|---|
| 3,154,783 | 10/1964 | Kerdock | 342/203 |
| 3,163,861 | 12/1964 | Suter | 342/28 |
| 3,255,450 | 6/1966 | Butler | 342/373 |
| 3,273,151 | 9/1966 | Cutler et al. | 342/353 |
| 3,295,134 | 12/1966 | Lowe | 342/368 |
| 3,300,768 | 1/1967 | Bystrom et al. | 340/552 X |
| 3,394,342 | 7/1968 | Walker | 367/93 |
| 3,394,374 | 7/1968 | Weiss | 342/370 |
| 3,448,450 | 6/1969 | Alfandari et al. | 342/81 |
| 3,691,558 | 9/1972 | Hoard et al. | 342/28 |
| 3,806,930 | 4/1974 | Gobert | 342/368 |
| 3,825,928 | 7/1974 | Williams | 342/158 |
| 3,854,132 | 12/1974 | Davies | 342/27 |
| 3,877,002 | 4/1975 | Cheal et al. | 340/552 |
| 3,890,615 | 6/1975 | Moran | 342/28 |
| 3,911,364 | 10/1975 | Langseth et al. | 375/40 |
| 4,051,472 | 9/1977 | Albanese et al. | 342/28 |
| 4,191,953 | 3/1980 | Woode | 340/552 |
| 4,213,126 | 7/1980 | Mulder et al. | 342/36 |
| 4,217,592 | 8/1980 | Schwab | 343/844 |
| 4,287,579 | 9/1981 | Inoue et al. | 367/94 |
| 4,316,191 | 2/1982 | Sawatari et al. | 342/148 |

Primary Examiner—Thomas H. Tarcza
Assistant Examiner—Gilberto Barrón, Jr.
Attorney, Agent, or Firm—Foley & Lardner, Schwartz, Jeffery, Schwaab, Mack, Blumenthal & Evans

[57] ABSTRACT

The invention comprises a plurality of monostatic devices for radiating and receiving signals. The monostatic devices are disposed in a vertical spaced relationship such that signals from each device follow a direct path to an object to be detected and a reflected path to the object to be detected. The reflected path includes a path to a surface below the object and a path from the surface to the object. The signals are then reflected from the object and return through both the direct and reflected path. The monostatic devices may be radar antennas or acoustic transmitters.

32 Claims, 4 Drawing Sheets

NEAR-FIELD MONOSTATIC INTRUSION DETECTION SYSTEM

BACKGROUND OF THE INVENTION

The present invention relates to the field of radar and acoustic technology and, more particularly, to the field of controlling radar and acoustic detection sensitivity in near-field applications, such as personnel intrusion detection.

In radar technology directed toward intrusion control, the target of interest is, or may become, relatively close to the radar antenna and to the ground surface such that the normally used far-field assumptions no longer apply. Control over radar detection sensitivity as a function of near-field range is especially critical in an intrusion detection system where detection sensitivity to the minimum target must be maintained over the required surveillance region without developing areas that are oversensitive to the presence of non-targets, such as birds and small animals, or to the effects of environmental changes. In other types of radar deployed as short ranges, sensitivity control is often important in order to bound the radar dynamic range requirements.

Two methods of accomplishing control over area sensitivity are described in U.S. Pat. No. 3,300,768, entitled "Radiant Energy Type Intrusion Alarm System", to Albin Bystrom, Robert V. Hill, and Herbert A. Williams, assignors to The Boeing Company, Seattle, Wash. Both of these methods employ four antenna elements, deployed as a "multi-static" radar system, in which transmitting and receiving antenna elements occupy separate locations. In a first embodiment, the antennas are placed at the corners of a square so that the surveillance region effectively surrounds the target area. Although all four antennas point approximately toward the center of the protected area, the two transmitting elements are diametrically opposite one another, as are the receiving elements, so that no transmitting antenna element is oriented directly toward a receiving element. The elements used have shaped patterns which are intended to provide even coverage over a circle with the antennas located on its circumference. Range gating is used to restrict sensitivity to the defined area, gating out reflections from large scatterers on the outside.

Although such systems have been and continue to be used, they have developed certain disadvantageous false-alarm and maintenance problems. In order to understand these problems, it must be recognized that the multi-static system is a "forward-scattering" system, in which signals from the site surface as well as from the target are reflected in a forward direction from the transmitting antenna element to a target or the surface and on to the receiving element. Such a system is to be distinguished from a monostatic system in which radiation is backscattered from the target to the same antenna that transmitted the signal. Forward scattering works well on the target, but, unfortunately, the forward-scattered signal from the surface is orders of magnitude larger than that from a human intruder and, moreover, such surface scattering is subject to change with change in the state of the environment (wet, dry, snow, freezing, thawing, etc.). The above-cited reference compensated for environmental state changes by establishing a bridge between the antenna elements that balanced out those large surface-reflected signals. However, erosion and discrepancies in the site grading frequently served to reduce the effectiveness of the bridge. Heavy rain on the antennas was found to make small but uncompensated phase shifts in the large signals between antennas that have caused numerous false alarms. Thermal differences in the cables have caused imbalances in the bridge was well as causing intermittent connections, resulting even in destruction of cable connectors. These systems, with their four long cables and many connectors, and their requirements for delicate phase balancing have become increasingly difficult to maintain.

A number of solutions to overcome the difficulties of the prior art system are proposed herein. A monostatic radar would, for example, solve the problem of the large signals from the surface, since backscattering from smooth surfaces is many orders of magnitude less than specular forward scattering. The plural cables previously needed could be reduced to a single cable between the radar and the antenna feed. If azimuthally omnidirectional antennas are used, circular symmetry of coverage is automatic, and range gating can be used to reduce supersensitivity to interfering changes at the antenna, such as caused by rain, snow, or other precipitation since the antenna is at the center of the region, and is thus self-protecting. Range gating may also be used to restrict coverage to some outer, circular bound. However, the problem of establishing evenness of coverage to a low-profile intruder remains. Sensitivity Time Control (STC) and antenna pattern control through arraying are methods used successfully to attain desired sensitivity control in radars where far-field assumption is applicable; examples are the use of STC voltage gain proportional to the square of the range in antiaircraft fire control radars and of the use of $CSC^2\theta \, COS^{\frac{1}{2}}\theta$ patterns in airborne ground-mapping radars. In near-field radars, single-element sensitivity becomes a much more complicated and rapidly varying function of range, due to phase and amplitude variations of ground-surface reflections, rendering standard monotonic, narrow-bandwidth STC functions unusable. Complex, wide-bank STC functions can be used, but are difficult to implement and suffer a high cost and reliability penalty.

Normal antenna pattern synthesis also cannot be used for near-field cases, both because of the presence of the ground-surface reflections and because the angle from each element or portion of the antenna to the target is different from that of each other. As a result, the composite "pattern" of the antenna is not independent of the range and/or height of the target.

SUMMARY OF THE INVENTION

One object of the present invention is to provide a detection system which accurately and reliably detects objects such as personnel within a predetermined near-field range.

Another object of the present invention is to provide a near-field object detection system which utilizes and takes advantage of ground reflection signals to enhance the sensitivity and accuracy of the system.

A further object of the present invention is to provide a near-field object detection system which utilizes monostatic transmission and reception devices.

A still further object of the present invention is to provide a near-field object detection systems which avoids the use of Sensitivity Time Control.

In accordance with the above and other objectives, the present invention is a near-field object-detection system which comprises a plurality of monostatic devices for radiating and receiving signals. The monostatic devices are disposed in a vertically-spaced relationship such that signals from each monostatic device follow a direct path to an object to be detected and a reflected path to the object. The return paths include one directly from the object to each monostatic device and a path from the object to the surface below the object and reflected to each monostatic device.

Near-field sensitivity control is obtained in accordance with the invention by utilizing a stacked vertical array of elements in the monostatic configuration. Control is exercised in the vertical plane, and includes the surface over which the elements operate as another component in the design. This is in contrast to the multistatic design in the patent cited above, wherein the pattern shaping is in the horizontal plane and the effects of ground reflections on target sensitivity are not taken into account.

The invention also may include a unique phase shift applied to the signals from each device, a unique time delay applied to the signals from each device, and an individual weighting function applied to the signals of each device.

The heights of the monostatic devices are chosen such that constructive and destructive interference occurs for signals from each device following the direct and reflected paths to the object to be detected. The constructive interference occurs at a different distance for each device, as does the destructive interference.

The height of the highest monostatic device is chosen to provide constructive interference at the greatest range of the system, whereas the height of the monostatic device having the lowest height is chosen to provide constructive interference at the closest range of the system.

In accordance with other aspects of the invention, the monostatic devices may be radar antennas.

The system may also include a range gating circuit.

BRIEF DESCRIPTION OF THE DRAWINGS

The above and other objects of the present invention will become more readily apparent as the invention is more fully understood from the detailed description to follow, reference being made to the accompanying drawings in which like reference numerals represent like parts throughout, and in which.

DETAILED DESCRIPTION OF THE PREFERRED EMBODIMENT

It will be understood that the principles of the present invention apply to both radar and acoustic systems such as ultrasonic systems. The following description relates to radar, for simplicity. However, one of ordinary skill in the art will readily recognize that this discussion also applies to acoustic systems such as ultrasonic systems.

Figure 1:
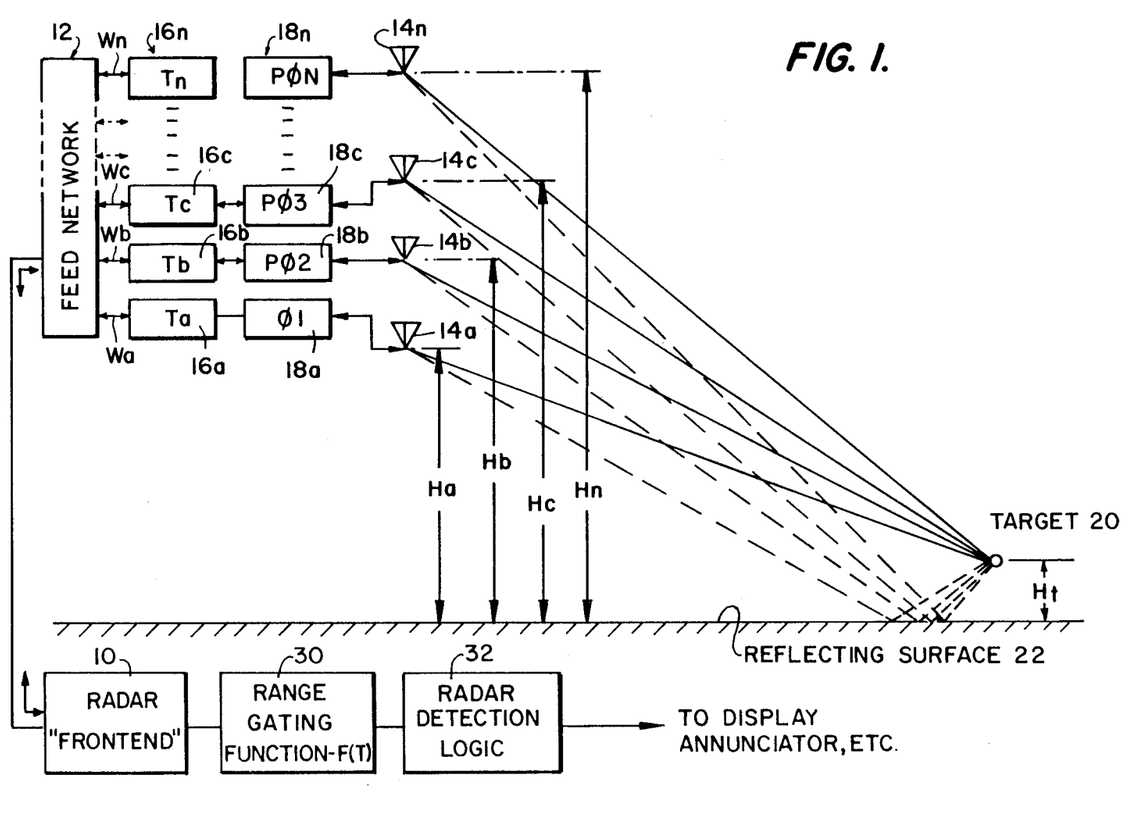
FIG. 1 is a block diagram showing the object detection system of the present invention.

FIG. 1 is a block schematic diagram of the invention showing a monostatic, range-gated radar with control functions used for determining range sensitivity of the radar to a low-profile target. The radar front-end 10 transmits a time-tagged signal to the feed network 12 which divides the transmit signal power to feed N separate antennas $14a \ldots 14N$. The feed network 12 gives the signal to element $14a$ an amplitude weight $W_a$ and has a separate weighting function, $W_b$, $W_c$, etc. up to $W_n$ for element N. These amplitude weighted signals are fed to delay circuits $16a, 16b \ldots 16N$ to provide respective range gating delays $t_a, t_b \ldots t_N$ for each element. The amount of delay may be varied from zero to a few nanoseconds to control the range gating for each antenna in a known manner. The weighted delayed signals are then each given an additional phase shift $\phi_a, \phi_b, \ldots \phi_N$ in phase networks $18a, 18b \ldots 18N$, and then delivered to the respective elements $14a, 14b \ldots 14N$. These antenna elements $14a-14N$ are stacked vertically at carefully selected heights, $H_a, H_b \ldots H_N$. With the vertically stacked array, signals radiated by each element will reach any backscattering object that has any height above the surface by two paths. The first direct path is defined as the shortest distance between the antenna and the object, and the second path is specularly reflected by the surface with angles of incidence being equal to the angles of reflection. In FIG. 1 this multipath is shown by solid lines connecting each element with one such object, the target 20, and by dashed lines going from each element to the reflecting surface 22, then to the target 20, which is located thereabove at a height $H_T$. Depending on $H_T$, the element height $H_i$, and the range of the $i^{th}$ element to the target, there will be (1) a difference in distance between the two paths; (2) a difference in amplitude due to element pattern, difference in distance, and ground reflection coefficient; and (3) a difference in phase, due both to the difference in distance in the two paths and the sign of the reflection coefficient, which, if the antenna element is vertically polarized, goes from negative to zero to positive as the grazing angle is increased from zero. Whatever the unique differences in phase and amplitude of the contribution of the two paths, they combine coherently to form a single illuminating signal at the target 20.

The back-scattered signal from the target 20 arrives at each of the antenna elements 13 by the same two paths by which it was transmitted; the direct path and the reflected path. The signal from the two paths is again combined coherently at each antenna element 14 whose pattern again helps determine the relative amplitude of the signals arriving via these paths. This combined signal is given its unique phase shift $\phi_i$, its unique delay $t_i$, and is combined with the phase-shifted, delayed and amplitude-weighted signal from each other element after being itself amplitude weighted by the feed network 12.

The combined signal now reaches the radar "front end" 10 where it is diverted to the receiver by a transmit/receive (T/R) switch, a circulator, or some combination of the two. It is then gated by some range-gating function 30, which uses the time-tagged transmit waveform to distinguish signals on the basis of their time delay. The radar function 30 is completed by operating on the gated signal with some detection logic 30, which uses appropriate filtering, integration, thresholding, etc., to determine the presence or absence of the target and make that result known via a display, annunciator, or similar device.

The controls which are utilized in a unique fashion by this invention include the selection of the number N, of antenna elements 14, the height of each $i^{th}$ element, $h_i$, the pattern of each element (which may be selected independently if it does not interfere with stacking); the phase, $\phi_i$, given the signal to/from from the $i^{th}$ element on both transmit and receive by phase network 18; the range gating delay $t_i$ given the signal to/from the $i^{th}$ element on both transmit and receive by the delay network 16; the two-way amplitude weighting, $W_i$ given by the feed network 12; and finally, the shaping of the range-gating function 30. How each of these items serves to obtain the desired sensitivity control for a target 20 at height $H_T$ over a given surface 22 is further explained below.

The geometry depicted in FIG. 1 shows the two significant factors that differentiate a near-field radar from a far-field one. First, the paths from each antenna element to the target are not parallel to one another; the paths taken by the specularly-reflected signals are also not parallel, so that basic far-field assumptions, that these rays are parallel, that the difference in phase in the signals from one element to the next is a linear function of distance between elements, and that the difference in range between element and target from one element to the other is negligible, are all violated. Thus, there is no stable, unique antenna array pattern as in the far-field case, but rather a pattern that, even without the presence of the reflecting surface, varies as a function of range.

The second difference is in the character of the surface-reflected signals themselves. In geometries where the grazing angle is small, the amplitude of the reflection coefficient (which governs how much of the signal striking the surface is reflected) approaches unity, and there is a phase reversal on reflection. If the path length difference between the direct path (solid lines) and the reflected path (dashed lines) is short in terms of electrical degrees, the reflected signal tends to cancel the direct-path signal on reaching the target, and the target-reflected signal by the direct path tends to be cancelled by the surface-reflected signal at the antenna. This condition of "destructive interference" occurs at shorter ranges for lower antenna elements than for higher antenna elements, so that the higher elements are more effective for detecting the longer-range targets.

Conversely, at short ranges, low elements are more effective at illuminating low targets than higher elements due to significant differences in range (the two-way direct path signal has an inverse fourth power range dependence). Also, at short ranges the difference in path length between direct and reflected paths in terms of electrical phase may be quite large, even several wavelengths, depending on the frequency. Where this is the case, the interaction between direct path and reflected path signals may alternate between constructive and destructive interference as a target is moved from short to long range. Since the locations of the constructive interference are functions of target and antenna element height, for a given target height, element heights $H_i$, can be chosen to shape the sensitivity by appropriate placement of the more sensitive regions of each element. Thus $H_i$ becomes a fundamental control over sensitivity in a much different sense than does the spacing between elements in a normal array designed for far-field use.

As in a far-field array, however, the spacing between elements does control relative phases of the signals reflected from a target. The adjustment of phase $P_i$ may be used together with very fine adjustment of element height $H_i$ to maintain a desired phase relationship between the signals. For applications such as intrusion-detection systems, the outer range limit is the most difficult region in which to provide adequate sensitivity. One way that phase control may be used is to "focus" the array for the lowest desired target at this outer-range bound; this can be accomplished iteratively with fine adjustment of the "$H_i$'s" to established desired phase control over the range extent. Further degrees of control are provided by means of the amplitude weights, $W_i$. Finally, the range gating function f(t) has a "shape" (amplitude versus time) that translates into amplitude versus range. The shape of that function depends on the waveform transmitted and on the gating function itself. The signal from each element may be individually placed within the range-gating function by adjustment of the delay $t_i$.

In summary, this invention utilizes a series of controls, including the height, the phase, the delay, and the amplitude weighting of each of N vertically stacked antenna elements to control radar sensitivity to targets close to a reflecting surface as a function of range. The number "N" governs the number of degrees of freedom for the exercise of radar sensitivity control—hence the fineness to which the control can be maintained.

The reflecting properties of the surface are taken into consideration and are utilized in the exercise of this contol. The sensitivity control is accomplished entirely in the vertical plane. While the initial application is in an intrusion-detection radar which uses omni-directional coverage in azimuth, there is nothing in the sensitivity control described herein that precludes coverage which is shaped independently in azimuth. For example, if the antenna elements have a narrow beam, the coverage could be virtually a screen, allowing a rectangular perimeter to be protected from two radar positions, each with two narrow beams in azimuth, rather than four locations, as is now necessary with bistatic systems.

As discussed above, while the invention herein is described in terms of radar systems, the principles of the invention are also applicable to other types of radiant energy, such as ultrasonic detection as employed in U.S. Pat. No. 3,394,342.

To understand how the various controls affect the operation of the present invention the equations for modeling a radar installation must be understood.

Derivation of Analytical Model

The model used as a synthesis/evaluation tool in structuring the present invention applies to the normal radar range equation, a complex expression which takes into account not only ground reflections ("multi-path"), but also the fact that the signal paths from each element of a multielement antenna to the target and back are not really parallel in the geometries pertinent to a site intrusion radar. The normal equation for signal-to-noise ratio (S/N) for targets in a Doppler frequency filter in a range gate, in "free space" and where the target is a point scatterer in the far zone of the radar antenna, is:

$$S/N = \frac{P_T G^2 \lambda^2 \sigma_T}{(4\pi)^3 K T_s B_n L R^4}.\qquad(1)$$

In equation (1), $P_T$ is the transmitted peak power of an assumed rectangular pulse in a matched, synchronized rectangular gate; G is the power gain of the antenna in the target direction; $\lambda$ is the radar operating wavelength; $\sigma_T$ is the radar cross-section of the target; $(4\pi)^3$ is a constant arising from the spherical spreading of electromagnetic waves to and from the antenna and target; K is Boltzmann's constant $(1.38062 \times 10^{-23})$; $T_s$ is the radar system noise temperature, which is the product of the operating temperature in degrees Kelvin and the system noise figure; $B_n$ is the noise bandwidth of the Doppler filter; L represents the radar losses; and R is the slant range from radar antenna phase center to the target.

The short-range model separates from the normal radar equation those factors that vary with target height and range, so that the equation becomes:

$$S/N = \frac{P_T G_o^2 \lambda^2 \sigma_T}{(4\pi)^3 K T_s B_n L} |E|^4.\qquad(2)$$

In equation (2), the term $G_o$ is the gain of a single element of the antenna at its peak; in the case of a half-wave dipole, which is the basic element used for the site intrusion radar, $G_o$ is approximately 1.65 (2.17 dB). The term $\vec{E}$ represents the normalized voltage illumination function at the target, which includes the coherent sum of the signals arriving at the target via every known path. By reciprocity, the scattered fields from an isotropic target must arrive at the antenna terminals by the same paths; therefore, the normalized voltage function at the point where the fields recombine is given by $\vec{E}^2$; the normalized power, then is $|\vec{E}|^4$.

For a simple vertical half-wave dipole in free space, the illumination function $\vec{E}$ is given by:

$$E = \frac{A(\theta)}{r} e^{-jkr}.\qquad(3)$$

Here, the symbol $A(\theta)$ is the voltage pattern of the half-wave dipole as a function of the elevation angle from the antenna to the target. If $\theta$ is defined as the depression angle with respect to the normal to the dipole then $A(\theta)$ for a half-wave dipole is given by:

$$A(\theta) = \frac{\cos(\pi/2 \sin\theta)}{\cos\theta}.\qquad(4)$$

The symbol r in equation (3) is the slant range from the dipole to the target; k is the propagation constant of free space, given by
$$k = 360 f/c\qquad(5)$$
when expressed in degrees, as a function of the radar frequency, f, and the speed of wave propagation, c.

Figure 2:
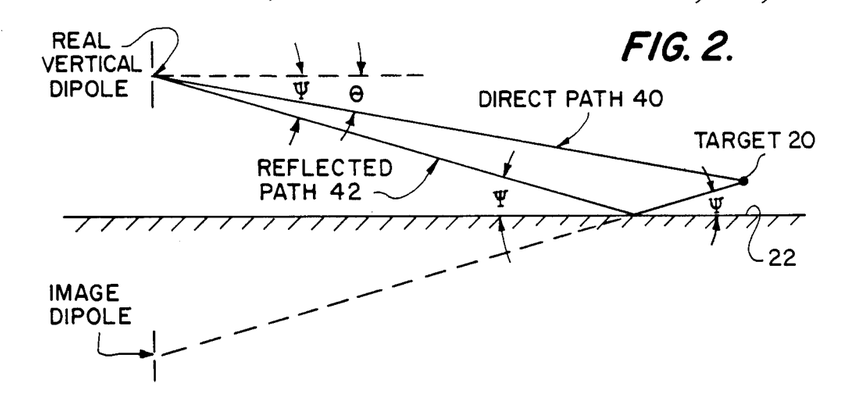
FIG. 2 is a schematic view showing the reflecting surface geometry corresponding to the present invention.

When a reflecting surface is introduced to the antenna-target geometry, the signal from the antenna to the target now arrives via two paths as shown in FIG. 2. A direct path 40 extends directly to the target 20 while a reflected path 42 is reflected from surface 22. The direct-path signal 40 is unaltered by the presence of the reflecting surface 22; the signal still traverses a distance r at an angle $\theta$, and equations (3) and (4) apply. Surface reflection may be considered to occur at a point where the incident energy and reflected energy make the same angle with the surface. This angle is designated $\Psi$. If $\Psi$ is substituted for $\theta$ in equation (4), the equation may be used for the antenna voltage gain. The path for the reflected signal is longer than the direct path. The signal via the reflection path also depends on the characteristics of the reflecting surface, which constitutes a less-than-perfect mirror. The reflection coefficient for the surface depends on both the dielectric properties and the roughness of the surface. If the reflection coefficient is labelled $\rho(\Psi)$, and the reflection path length labelled $r(\Psi)$ for the reflected signal, the illumination function for the reflected component is now given by:

$$E_R = \frac{A(\Psi)\rho(\Psi)}{r(\Psi)} e^{-jkr(\Psi)}.\qquad(6)$$

Letting the direct path slant range be denoted by $r(\theta)$, we may now express the total illumination function by the expression:

$$E = \frac{A(\theta)}{r(\theta)} e^{-jkr(\theta)} + \frac{A(\Psi)\rho(\Psi)}{r(\Psi)} e^{jkr(\Psi)}.\qquad(7)$$

Figure 3:
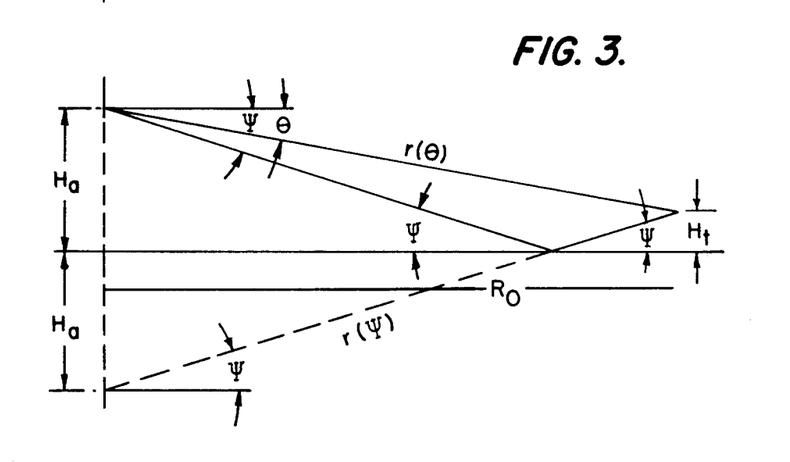
FIG. 3 is a schematic view showing the geometric relationships used in deriving a model of the present invention.

A desired function of the model is to determine the signal-to-noise ratio as a function of ground range between the radar antenna and the target. Designating ground range as $R_o$, and noting the geometry of FIG. 3, we see that $\theta$, $\Psi$, $r(\theta)$, and $r(\Psi)$ may be found from the height of the antenna ($H_a$), the height of the target above ground ($H_t$) and the ground range by means of the following equations:

$$\theta = \tan^{-1} \frac{H_a - H_t}{R_o};\qquad(8)$$

$$\Psi = \tan^{-1} \frac{H_a + H_t}{R_o};\qquad(9)$$

$$r(\theta) = R_o/\cos\theta = R_o \sec\theta;\qquad(10)$$

and $$r(\Psi) = R_o/\cos\Psi = R_o \sec\Psi.\qquad(11)$$

Using these relationships, equation (7) may be rewritten in the form $$\vec{E} = 1/R_o[A(\theta)\cos\theta e^{-jkR_o\sec\theta} + A(\Psi)\cos\Psi\rho(\Psi)e^{-jkR_o\sec\Psi}].\qquad(12)$$

The reflection coefficient, $\rho(\Psi)$, for a smooth surface with the polarization in the plane of incidence is found from the expression $$\rho(\Psi) = \left[\frac{\epsilon_r \sin\Psi}{\sqrt{\epsilon_r - \cos^2\Psi}} - 1\right] \div \left[\frac{\epsilon_r \sin\Psi}{\sqrt{\epsilon_r - \cos^2\Psi}} + 1\right],\qquad(13)$$

where $\epsilon_r$ is the dielectric constant of the surface relative to that of free space. Equation (13) holds whether $\epsilon_r$ is entirely real or is complex, as is the case for lossy materials. From test data it has been verified that the assumption that $\epsilon_r$ is real causes negligible error for most site surface materials at 300 MHz operating frequency. Most reasonably dry materials, including sand, loam, and blacktop, exhibit a relative dielectric constant of about 5; when wet but not saturated, this value goes to about 11. Dry, powdery snow has a dielectric constant of about 2. Surface roughness modifies the reflection coefficient of a surface as a function of wavelength, $\lambda$, incident/reflection angle, $\Psi$, and the standard deviation of surface height, designated H, in accordance with the expression:

$$\rho(\Psi)_r = \exp[-2(2\pi H \sin \Psi/\lambda)^2]\rho(\Psi), \quad (14)$$

where $\rho(\Psi)_r$ is the reflection coefficient for the rough surface. At low incident angles, $\rho(\Psi)$ tends to have large negative values and, hence, a great deal of influence on the magnitude of $\vec{E}$. Accordingly, at low incident angles, surface roughness tends to have little effect. At higher incident angles, roughness tends to reduce the reflection coefficient, but this effect takes place at angles where the magnitude of $\rho(\Psi)$ is already small. When the roughness effect has been included in calculating the signal-to-noise ratio for a $\frac{1}{2}$-meter high target and a 6-meter high vertical dipole with a dielectric constant of 5, it was found that the result differed from the smooth-surface case by no more than 0.4 dB at close range and by 0.1 dB or less at ranges beyond 6 meters for a surface roughness corresponding to a sinusoid 0.1 wavelengths peak to peak. The model as exercised for synthesis and evaluation purposes has not included the roughness factor because it has been assumed that normal site grading would preclude that degree of roughness at the radar frequency ($\lambda \approx 0.9967$ meter).

Equations (8) through (13), accordingly, are the basic equations from which the model is structured. Provisions for modelling multi-element antennas were made by summing the contributions of each. For N equally-fed half-wave dipole elements fed in phase, the expression for E becomes $$E(N) = \frac{1}{R_o} \sum_{n=1}^{N} [A(\theta_n)\cos\theta_n e^{-jkR_o\sec\theta_n} + \quad (15)$$

$$A(\Psi_n)P(\Psi_n)\cos(\Psi_n)e^{-jkR_o\sec\Psi_n}].$$

Equation (15) is correct for the illumination function of N evenly fed dipoles; however, since transmit power must be divided N ways to feed the N elements, equation (2) must be modified to include power division. In the general case, where variable weight may be used, the expression for transmitted power must be divided by $$\sum_{n=1}^{N} W_n^2,$$

where $W_n$ is the voltage weighting function given the n'h element. In the case of even weighting, the divisor reduces to N.

Equation (15) must also be modified to accommodate both unequal amplitude weighting and phasing of the individual elements. For this case, the illumination function becomes:

$$E(N) = \frac{1}{R_o} \sum_{n=1}^{N} W_n[A(\theta_n)\cos\theta_n e^{j(\phi_n - KR_o\sec\theta_n)} + \quad (16)$$

$$A(\Psi_n)\rho(\Psi_n)\cos(\Psi_n)e^{j(\phi_n - KR_o\sec\Psi_n)}].$$

Figure 4:
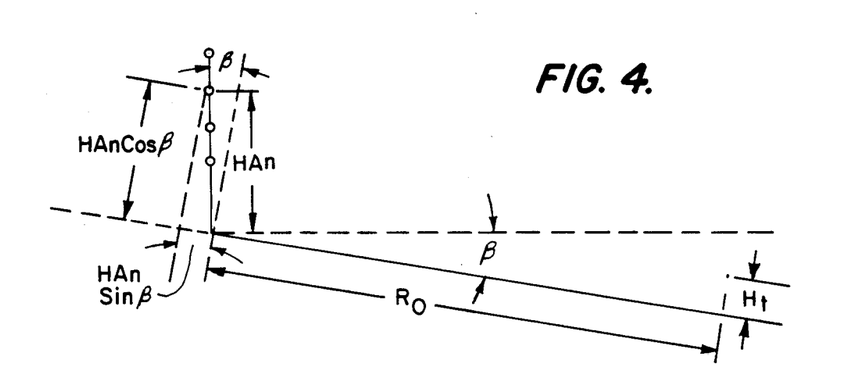
FIG. 4 is a schematic view showing the antenna tilt geometry used in deriving a model of the present invention.

Equation (16) is valid for a collinear vertical dipole array oer a flat surface. In order to adapt the model to surfaces that are not normal to the antenna, an assumption is made that the antenna itself is tilted an angle $\beta$ with respect to the surface, which is still considered to be flat. The geometry is depicted in FIG. 4. If the height of element n along the array is designated $HA_n$, then the effective height of the element above the surface is shortened to $HA_n \cos\beta$; conversely, the projected ground distance between element and target becomes extended by the distance $HA_n \sin\beta$. Equations (8) through (11) now become equations (17) through (20):

$$\theta_n = \tan^{-1}\frac{HA_n\cos\beta - H_t}{R_n} \quad (17)$$

$$\psi_n = \tan^{-1}\frac{HA_n\cos\beta + H_t}{R_n} \quad (18)$$

$$r_n(\theta) = R_n/\cos\theta = R_n\sec\theta \quad (19)$$

$$r_n(\Psi) = R_n/\cos\psi = R_n\sec\Psi$$

where $R_n = R_o + HA_n \sin\beta$. \quad (21)

Since the normal to the antenna is no longer parallel to the surface, the pattern terms in equation (16) must be modified from $A(\theta_n)$ and $A(\Psi_n)$ to $A(\theta_n+\beta)$ and $A(\Psi_n+\beta)$, respectively. Another change is made to the illumination function expression in order to utilize intermediate results in the synthesis process. The phase expressions $kR_n\sec\theta_n$ and $kR_n\sec\Psi_n$ actually represent many cycles of phase excursion, or thousands of degrees at moderate ranges. To understand the behavior of $\vec{E}(N)$, it is the phases of the components with respect to one another that is desired. The solution chosen was to add and subtract the phase at the phase center of the array, in the form:

$$e^{j(\phi_n - kR_n\sec\theta_n)} = e^{-jkr_o}e^{-j\phi_n}e^{-jk(r_n - r_o)} \quad (22)$$

and $$e^{j(\phi_n - kR_n\sec\psi_n)} = e^{-jkr_o}e^{-j\phi_n}e^{-jk\left(r_n\frac{\cos\theta_n}{\cos\psi_n} - r_o\right)} \quad (23)$$

where $r_n = R_n\sec\theta_n$, \quad (24)

$r_o = R_N\sec\theta_N$, \quad (25)

$$R_n = R_o + \frac{1}{N}\sum_{n=1}^{N} HA_n\cos\beta, \quad (26)$$

and $$\theta_N = \tan^{-1}\frac{\frac{1}{N}\sum_{n=1}^{N} HA_n\cos\beta - H_t}{R_N}. \quad (27)$$

Substituting the above results in equation (16) gives us the model formulation for $\vec{E}(N)$;

(28)

-continued $$E(N) = e^{-jkr_o} \sum_{n=1}^{N} \frac{W_n e^{-j\theta_n}}{R_n} \left[ A(\theta_n + \beta)\cos\theta_n e^{-jk(r_n - r_o)} + \right.$$

$$\left. A(\psi_n + \beta)\rho(\psi)\cos\psi_n e^{-jk}\left(r_n \frac{\cos\theta_n}{\cos\psi_n} - r_o\right)\right].$$

The model as implemented in TI-59 and Tektronix 4054 programs outputs the signal-to-noise ratio in dB. For this purpose, equation (2) takes the form $$S/N(dB) = 10 \log_{10} P_t - 10 \log_{10} \sum_{n=1}^{N} W_n^2 + 20 \log_{10} G_o + \quad (29)$$

$$20 \log_{10} c - 20 \log_{10} f + 10 \log_{10}° T - 30 \log_{10}(4\pi) (2^a) -$$

$$10 \log_{10} K - 10 \log_{10} T_s - 10 \log_{10} B_n - L(dB) +$$

$$40 \log_{10} |E(N)|.$$

The fixed components of equation (29) are as follows:

$20 \log_{10} G_o = 4.34$ dB($\frac{1}{2}$-wave dipole)

$20 \log_{10} C = 20 \log_{10}(299.793$ Meters/microsecond$)$ $\quad = 49.536$ dB $30 \log_{10}(4\pi) = 32.976$ dB $10 \log_{10} k = 10 \log_{10}(1.38062 \times 10^{-23}$ joules/degree/K.$)$ $\quad = -228.599$ dB;

therefore, $20 \log_{10} G_o + 20 \log_{10} c - 30 \log_{10}(4\pi) - 10 \log_{10} k =$ $$4.34 + 49.536 - 32.976 + 228.599 = 249.499 \approx 249.50,$$

and equation (29) is programmed as the model in the form of the basic equation for signal-to-noise ratio as follows:

$$S/N(dB) = 249.5 + 10 \log_{10} P_t - 10 \log_{10} \sum_{n=1}^{N} W_n^2 - \quad (30)$$

$$20 \log_{10} f + 10 \log_{10} T - 10 \log_{10} T_s - 10 \log_{10} B_n -$$

$$L(dB) + 40 \log_{10} E(N).$$

where $\vec{E}(N)$ is determined by equation (28) using the following equations to determine the non-input variables:

$$k = 360 f/c \text{ (expressed in degrees)} \quad (5)$$

$$R_n = R_o + HA_n \sin \beta \quad (21)$$

$$\theta_n = \tan^{-1} \frac{HA_n \cos\beta - H_t}{R_n} \quad (17)$$

$$\psi_n = \tan^{-1} \frac{HA_n \cos\beta + H_t}{R_n} \quad (18)$$

$$r_n = R_n/\cos\theta_r = R_n \sec\theta_n \quad (24)$$

$$r_o = R_N \sec\theta_N, \quad (25)$$

$$R_n = R_o + \frac{1}{N} \sum_{n=1}^{N} HA_n \sin\beta, \quad (26)$$

-continued $$\theta_N = \tan^{-1} \frac{\frac{1}{N} \sum_{n=1}^{N} HA_n \cos\beta - H_t}{R_N}. \quad (27)$$

The input variables are as follows:

TABLE 1

MODEL INPUT VARIABLES

| VARIABLE | SYMBOL | UNITS |
|---|---|---|
| Radar: | | |
| Peak Transmitter Power | $P_T$ | Watts |
| Frequency | f | Megahertz |
| System Effective Noise Temperatures | $T_s$ | Degrees/Kelvin |
| Detection Filter Noise Bandwidth | $B_N$ | Hertz |
| Radar Losses | L(dB) | Decibels |
| Antenna: | | |
| Number of $\frac{1}{2}$-wave dipoles | N | Integers |
| Tilt Angles to Surface | $\beta$ | Degrees |
| Element Height (1 per element) | $HA_n$ | Meters |
| Element Voltage Amplitude Weight (1 per element) | $W_n$ | Relative Volts |
| Element Phase (1 per element) | $\phi_n$ | Degrees |
| Target: | | |
| Height Above Surface | $H_t$ | Meters |
| Radar Cross Section | $\sigma_T$ | Square Meters |
| Site: | | |
| Surface Relative Dielectric Constant | $\epsilon_r$ | Units |
| Surface Range - Antenna Base to Target | $R_o$ | Meters | and $$\rho(\Psi_n) = \frac{\epsilon_r \sin\Psi_n}{\sqrt{\epsilon_r - \cos^2\Psi_n}} - 1 \div \frac{\epsilon_r \sin\Psi_n}{\sqrt{\epsilon_r - \cos^2\Psi_n}} + 1. \quad (13)$$

Synthesis/Evaluation Techniques and Sensitivity Curves

A site intrusion detection radar differs from conventional radars in several respects, almost all due to the fact of proximity of the target to the radar and to the ground. Where more conventional radar designs are driven hard to produce adequate power/gain budgets to detect targets above thermal noise, the site intrusion detection radar, even with very low radiated power, low antenna gain and a poor noise figure, exhibits large margins. Conversely, discrimination against clutter and various types of moving non-targets, such as birds and small animals, becomes a principal thrust of radar design. Where the site radar is monostatic (transmitting and receiving antenna sharing the same location), variation of target signal over the surveillance area can be a significant problem not only from the standpoint of the dynamic range required for the radar receiver operation, but also from the standpoint of maintaining a positive ratio of target signal to non-target signal with a target in a low-sensitivity area and a non-target in a high sensitivity area.

One aim of the present invention is to develop a system which exhibits minimum variation of signal-to-noise for a low-profile target throughout each range gate. This low-profile target has been arbitrarily defined as an omni-directionally scattering target of 1 square meter cross-section and placed 0.5 meters above the site surface. If this target were placed above a reflectionless site and illuminated by a 4-meter high, omnidirectional antenna, the variation in sensitivity over the surface range from 2.5 meters to 50 meters would be about 43 dB. Should the surface be composed of normal, fairly dry alluvial material, the variation due to the combination of range and reflection effects now becomes slightly more than 56 dB.

One common radar technique often used to reduce signal variation as a function of range is Sensitivity Time Control (STC). This technique is very powerful over normal radar geometries where the variation of the signal without STC is relatively slow (a few dB per microsecond). In the example of the omnidirectional antenna and the realistic surface, the variation of 56 dB occurs is less than 152 nanoseconds, and the variation is not an easily programmed function, such as linear, power series, logarithmic, etc. Accordingly, although STC can be incorporated in the present invention, it has been deemed more desirable to seek other means to reduce the variation in target signal as a function of range.

Another method of obtaining evenness of coverage is the use of shaped antenna patterns; the use of a "cosecant-squared" pattern for ground-mapping radars is an example. Even the use of a simple half-wave dipole in the place of the omni in the example above reduces the variation in signal levels from 56 dB to about 44 dB.

Although shaped antenna patterns may obviously be used to shape the range sensitivity of the radar to the low-profile intruder, normal synthesis techniques do not apply. First, there is the presence of the reflecting surface, so that for each element which illuminates the target from above the site surface there is an image element which also illuminates the target. The illumination from the image element not only varies as the element pattern but also varies with the surface reflection coefficient, which is a function of the surface itself and the angle from the image to the target. Secondly, the paths from the element and its image are not parallel, nor are the paths from different elements themselves. With non-parallel paths, the gain of each element and of its image differs from each other and from those of each other element and their images. Two important assumptions made in far-field array theory are thus violated; that the pattern is the product of the element function and the array function, and that the phase distance from each element to the target is the distance from the phase center of the array to the target plus an amount which is proportional to the distance (positive or negative) of the element from the center of the array times the size of the angle from the normal to the array of the target.

Figure 5:
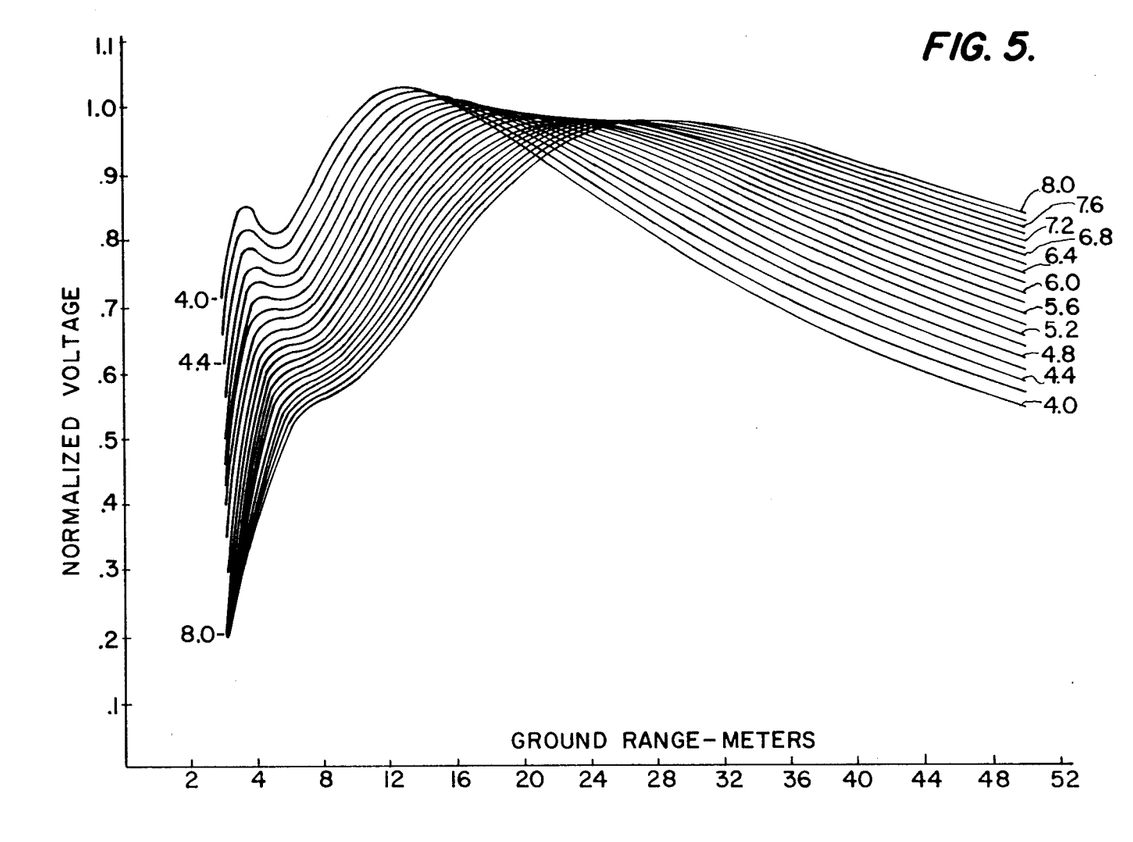
FIG. 5 is a graph showing ground range on the abscissa versus normalized voltage on the ordinate for various antenna heights.
Figure 6:
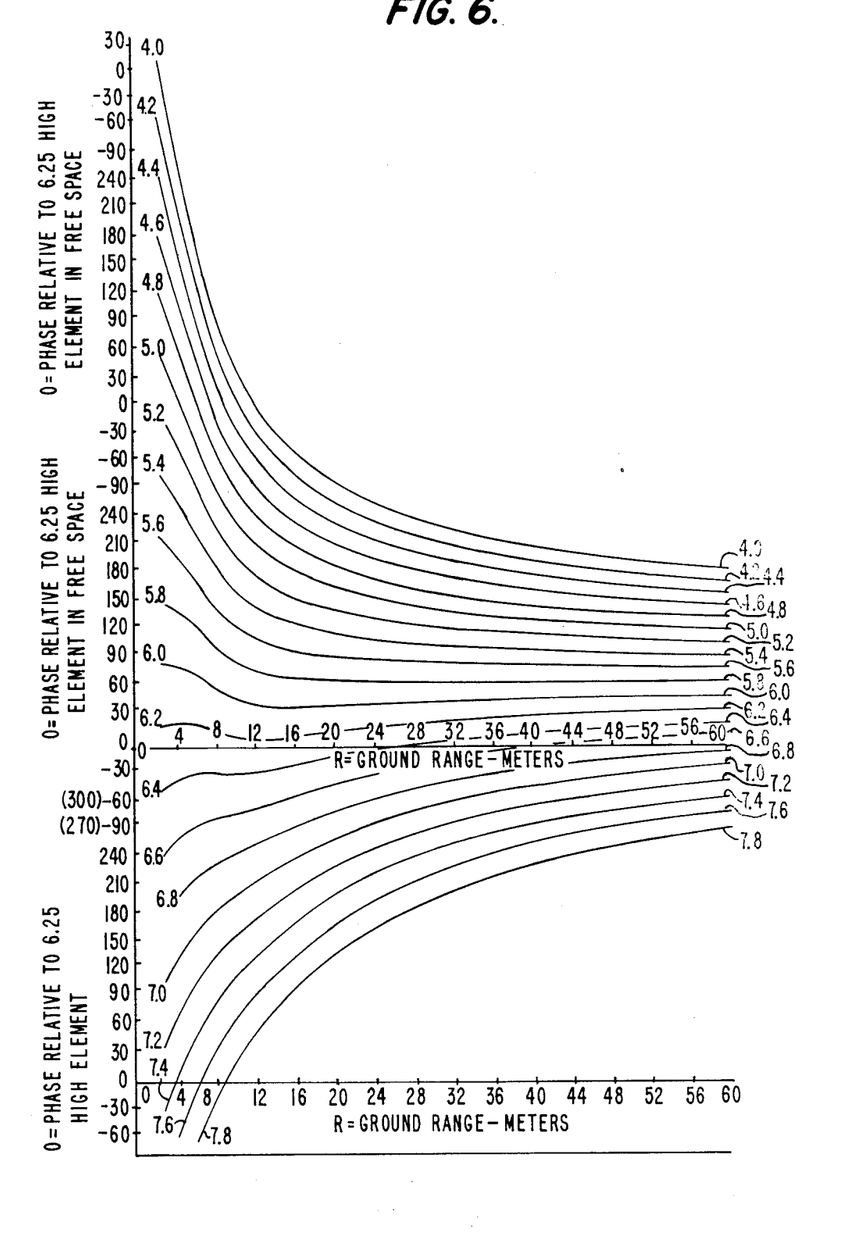
FIG. 6 is a graph showing ground range on the abscissa versus phase angle on the ordinate for various antenna heights.

These effects are illustrated in FIGS. 5 and 6. In FIG. 5, some normalized voltage pattern data are shown for dipole elements of a dipole array illuminating a half-meter high target above a realistic earth surface as a function of range. Normalization is such that if there were no image, and the angle to the target was the same as of a 6-meter high element, the normalized voltage pattern is unity. The resultant of two elements, each with its image, is shown: one is 4 meters high and the other 8 meters high. Because of its proximity to the target and because the image signal is constructively adding to the direct signal at close ranges, the 4-meter high dipole yields more than twice the normal voltage at short range, but because of destructive interference from the image, becomes must less than normal at long range. The 8-meter high dipole yields less than normal voltage throughout, although very nearly approaches the normal element at midrange, where the reflection coefficient is zero and the difference in angle from the center element is small.

FIG. 6 shows the phase deviations of the resultants of the 4-meter high dipole with its image and the 8-meter high dipole.

The foregoing description is provided to illustrate the present invention but is not deemed to be limitative. Clearly, numerous variations can be made without departing from the scope of the invention as set forth in the claims.

What is claimed is:

1. A near-field object-detection system, comprising:
   a plurality of monostatic transducers for radiating and receiving direct and reflected non-parallel signals in a near field, said monostatic transducers being disposed in a vertically-spaced relationship such that signals from each said monostatic transducer follow a direct path to an object to be detected and a reflected path to said object to be detected, said reflected path including a path to a surface below said object and a path from said surface to said object; and
   means for receiving signals from each of said monostatic devices and identifying objects in said near field therefrom;
   wherein the heights of said monostatic devices are such that constructive interference occurs between the direct path signal and the reflected path signal of each said device, said constructive interference occurring at a different distance for each of said monostatic devices.

2. A near-field object-detection system, comprising:
   a plurality of monostatic devices for radiating and receiving signals in a near field, said monostatic devices being disposed in a vertically-spaced relationship such that signals from each of said monostatic devices follow a direct path to an object to be detected and a reflected path to said object to be detected, said reflected path including a path to a surface below said object and a path from said surface to said object;
   means for receiving signals from each of said monostatic devices and identifying objects in said near field therefrom; and
   means for providing a unique phase shift to signals of each said monostatic devices;
   wherein the heights of said monostatic devices are such that constructive interference occurs between the direct path signal and the reflected path signal of each said device, said constructive interference occurring at a different distance for each of said monostatic devices.

3. A near-field object-detection system, comprising:
   a plurality of monostatic devices for radiating and receiving signals in a near field, said monostatic devices being disposed in a vertically-spaced relationship such that signals from each of said monostatic devices follow a direct path to an object to be detected and a reflected path to said object to be detected, said reflected path including a path to a surface below said object and a path from said surface to said object;
   means for receiving signals from each of said monostatic devices and identifying objects in said near field therefrom; and
   means for providing a unique time delay to signals of each said monostatic devices.

4. A near-field object-detection system as claimed in claim 2 including means for providing an individual weighting function to signals of each of said monostatic devices.

5. A near-field object-detection system as claimed in claim 2 wherein said monostatic devices are radar antennas.

6. A near-field object-detection system according to claim 2 wherein the height of the highest monostatic device is such as to provide constructive interference at the greatest range of said system.

7. A near-field object-detection system according to claim 6 wherein the height of the monostatic device having the lowest height is such as to provide constructive interference at the closest range of said system.

8. A near-field object-detection system according to claim 2 wherein said monostatic devices are positioned at various heights such that patterns of constructive and destructive interference between the closest range of said system and the greatest range of said system.

9. A near-field object-detection system according to claim 2 including means for providing a range gating function.

10. A method of near-field object-detection comprising:
    causing a plurality of vertically-spaced monostatic devices to radiate direct and reflected non-parallel signals such that signals from each said monostatic device follow a direct path to an object to be detected and a reflected path to said object to be detected, said reflected path including a path to a surface below said object and a path from said surface to said object and positioning said monostatic devices at heights such that constructive interference occurs from signals from each said device following said direct and reflected paths, said constructive interference occurring at a different distance for each said device;
    receiving reflected signals from said object by end of said monostatic devices through both said direct and said reflected paths; and
    identifying signals radiated and received by each of said monostatic devices.

11. A method of near-field object-detection comprising:
    causing a plurality of vertically-spaced monostatic devices to radiate signals such that signals from each said monostatic device follow a direct path to an object to be detected and a reflected path to said object to be detected, said reflected path including a path to a surface below said object and a path from said surface to said object and positioning said monostatic devices at heights such that constructive interference occurs from signals from each said device following said direct and reflected paths, said constructive interference occurring at a different distance for each said device;
    receiving reflected signals from said object by each of said monostatic devices through both said direct and said reflected paths; and identifying signals radiated and received by each of said monostatic devices; and
    providing a unique phse shift to signals of each of said monostatic devices.

12. A method of near-field object-detection comprising:
    causing a plurality of vertically-spaced monostatic devices to radiate signals such that signals from each of said monostatic device follow a direct path to an object to be detected and a reflected path to said object to be detected, said reflected path including a path to a surface below said object and a path from said surface to said object;
    receiving reflected signal from said object by each of said monostatic devices through both said direct and said reflected paths; and identifying signals radiated and received by each of said monostatic devices; and
    providing a unique time delay to signals of each of said monostatic devices.

13. A method according to claim 11 including providing an individual weighting function to signals of each said device.

14. A method according to claim 11 wherein said monostatic devices are radar antennas.

15. A method according to claim 11 wherein the highest monostatic device is positioned at a height to provide constructive interference at the greatest range of said system.

16. A method according to claim 15 wherein the lowest monostatic device is positioned at a height to provide constructive interference at the closest range of said system.

17. A method according to claim 10 wherein said monostatic devices are positioned at heights such that patterns of constructive and destructive interference occur between the closest range of the system and the greatest range of the system.

18. A method according to claim 10 including providing a range gating function for said radiated and received signals.

19. A near-field object-detection system as claimed in claim 3 including means for providing an individual weighting function to signals of each said monostatic devices.

20. A near-field object-detection system as claimed in claim 3 wherein the heights of said monostatic devices are such that constructive interference occurs between the direct path signal and the reflected path signal of each of said monostatic devices, said constructive interference occurring at a different distance for each of said monostatic devices.

21. A near-field object-deviation system as claimed in claim 3 wherein said monostatic devices are radar antennas.

22. A near-field object-detection system according to claim 20 wherein the height of the highest monostatic device is such as to provide constructive interference at the greatest range of said system.

23. A near-field object-detection system according to claim 22 wherein the height of the monostatic device having the lowest height is such as to provide constructive interference at the closest range of said system.

24. A near-field object-detection system according to claim 3 wherein said monostatic devices are positioned at heights such that patterns of constructive and destructive interference between the closest range of said system and the greatest range of said system.

25. A near-field object-detection system according to claim 3 including means for providing a range gating function.

26. A method according to claim 12 including providing an individual weighting function to signals of each said device.

27. A method according to claim 12 including positioning said monostatic devices at heights such that constructive interference occurs for signals from each said device following said direct and reflected paths, said constructive interference occurring at a different distance for each said device.

28. A method according to claim 12 wherein said monostatic devices are radar antennas.

29. A method according to claim 27 wherein the highest monostatic device is positioned at a height to provide constructive interference at the greatest range of said system.

30. A method according to claim 29 wherein the lowest monostatic device is positioned at a height to provide constructive interference at the closest range of said system.

31. A method according to claim 12 wherein said monostatic devices are positioned at heights such that patterns of constructive and destructive interference occur between the closest range of the system and the greatest range of the system.

32. A method according to claim 12 including providing a range gating function for said radiated and received signals.

* * * * *

UNITED STATES PATENT AND TRADEMARK OFFICE
CERTIFICATE OF CORRECTION

PATENT NO. : 4,837,574
DATED : June 6, 1989
INVENTOR(S) : HILL

It is certified that error appears in the above-identified patent and that said Letters Patent is hereby corrected as shown below:

Column 1, after the title insert --The government has rights in this invention pursuant to contract No. F04704-80-6-0029 awarded by the United States Air Force.--

Signed and Sealed this

Twelfth Day of June, 1990

Attest:

HARRY F. MANBECK, JR.

*Attesting Officer*      *Commissioner of Patents and Trademarks*